United States Patent Office 3,084,117
Patented Apr. 2, 1963

3,084,117
ORGANOCLAY-POLYOLEFIN COMPOSITIONS
Paul G. Nahin, Brea, and Peter Stanley Backlund, Anaheim, Calif., assignors to Union Oil Company of California, Los Angeles, Calif., a corporation of California
No Drawing. Filed Apr. 4, 1961, Ser. No. 100,520
24 Claims. (Cl. 204—158)

This invention relates to improved synthetic plastic materials, and in particular relates to methods for incorporating minerals such as clay into thermoplastic polyolefins such as polyethylene, polypropylene, polystyrene, polyvinyl chloride, and the like. The over-all objective is to provide means whereby substantial amounts of inexpensive clay may be incorporated into solid polyolefins, thereby reducing the cost per pound of such materials, without destroying the tensile strength and other desirable properties. Briefly, this object is obtained by first preparing an adduct of a clay with an organic base, then incorporating the adduct into the polyolefin, and finally subjecting the mixture to intense irradiation with e.g. gamma rays or beta rays to effect crosslinking. It is found that by this procedure, substantial amounts of clay, ranging up to as high as 80-90% by weight may be blended with typical polyethylenes, polyvinyl chlorides, polystyrenes, etc., and the mixture may be irradiated to produce a product having substantially the same, or even an improved tensile strength, as compared to the original polymer. Additionally we have found that the solvent resistance of the irradiated organoclay filled polymers is much greater than that of the irradiated unfilled or the clay filled and irradiated polymers.

As indicated, the over-all object of the invention is to provide inexpensive extenders or fillers for thermoplastic polyolefins. Another object is to provide means and methods for stiffening polyolefins and like plastic materials without decreasing the tensile strength, whereby such materials may be employed for a variety of uses for which the polymer itself is unsuited due to its flexibility and low melting point. Another object is to provide high-melting polyolefin compositions having high tensile strengths. A more specific object is to provide methods for chemically bonding inexpensive clays such as bentonite or kaolin into hydrocarbon polymers. Other objects will be apparent from the more detailed description which follows.

Thermoplastic hydrocarbon polymers such as polyethylene, polypropylene, polybutylene, polyisobutylene, polystyrene, polyvinyl chloride and mixed copolymers of such materials, are now being produced in increasing quantities. All of these materials are flexible, deformable plastics of relatively low melting point. Some of them, e.g. polyisobutylene, may be rubberoid in nature, whereas others such as polyethylene and polypropylene are relatively inelastic. All of these materials are limited in the uses to which they can be put, as a result of their cost, flexibility and low melting point. Many other uses would be opened if means could be provided for reducing their cost, increasing their melting point and/or increasing their rigidity. However, tensile strength is a property which is nearly always desirable, and the lack thereof would defeat substantially any utility.

The present invention is directed to the compounding and chemical combining of organoclays with any of the foregoing hydrocarbon polymers or copolymers. Any polyolefin derived from the polymerization or copolymerization of 2 to 6 carbon atom aliphatic monoolefins and halogen, alkyl or aryl substituted derivatives thereof may be employed. It is preferred to employ polymers having a melting point below about 400° C., and a molecular weight between about 5,000 and 200,000, and preferably about 10,000 to 50,000. Specifically contemplated are the polymers and copolymers of ethylene, propylene, butylene, isobutylene, n-pentene, butadiene, isoprene, styrene, $\alpha$-methyl styrene, vinyl chloride, and the like. Minor proportions of comonomers may also be included, such as styrene, acrylonitrile, methyl methacrylate, vinyl chloride, vinyl acetate and the like.

The effect of fillers on polyethylene has been studied to some extent. It has been found for example that the incorporation of conventional fillers such as carbon black, clay, silica, calcium carbonate, magnesium carbonate and the like will effect a substantial stiffening and raising of the melting point of polyethylene, but the tensile strength is always substantially reduced (Ind. Eng. Chem., 42, pp. 848–9). It has also been indicated that the tensile strength of carbon-black-filled polyethylene can be substantially improved by irradiation with high energy electrons (Chem. and Eng. News, 33, p. 5091, 1955). It has been theorized that this improvement may be due to the specific nature of carbon black, i.e. its ability to absorb free radicals generated by the radiations, thereby crosslinking itself into the polyethylene structure (J. Polymer Science, 19, p. 589).

We have attempted to produce clay-filled polyolefins of desirable tensile strength by irradiating the clay-filled materials analogously to the irradiation of the carbon-black-filled polyethylene. The results were negative; no appreciable improvement in tensile strength was observed in the irradiated clay-filled polyolefins as compared to the nonirradiated clay-filled materials. We have now discovered however that when the clay is adducted with an organic base, as by base exchange, to form essentially organic ammonium salts of the acid clay, and the organoclay adduct is incorporated into the polyolefin and the mixture then subjected to irradiation, the tensile strength of the product can be materially improved, and in some cases be made equal or superior to the tensile strength of the original unfilled polyolefin. The tensile strength of the unirradiated organoclay-filled polyolefin is usually not materially higher than the tensile strength of the simple clay-filled polyolefin. It is therefore apparent that in order to produce a clay-filled polyolefin of desirable tensile strength, it is critical both that the clay be adducted with an organic base, and that the mixture be subjected to irradiation to effect crosslinking.

In addition to the aforementioned improvement in tensile strength of the irradiated-organoclay filled polyolefins we observed a very striking increase in the solvent resistance of the the organoclay filled polymers which have been irradiated. While it is generally known that irradiation crosslinks polymers such as polyethylene and polystyrene and thus improves their solvent resistance, we have observed that the solvent resistance is improved to an even greater extent by incorporating an organoclay composition into the polyethylene prior to irradiation in accordance with our invention. The organic substituent bound to the clay surface presents sites, suitably methylene carbon atoms, which upon irradiation crosslink to carbon atoms in the polymer chain. Because of this type of crosslinking, the solvent resistance of the organoclay filled and irradiated polymer is greatly improved.

The clay fillers which may be employed herein include in general any of the natural alumino-silicates which exhibit base-exchange properties. The two principal subdivisions of natural clays comprise the bentonites and the kaolins. The bentonite clays, as found in nature, contain a high proportion of the montmorillonite type minerals such as montmorillonite, beidellite, nontronite, hectorite, saponite, sauconite. Montmorillonite is often characterized as $(Al_2O_3 \cdot 4SiO_2 \cdot H_2O + xH_2O)$. The kaolin clays are rich in kaolin minerals including kaolinite $$(Al_2O_3 \cdot 2SiO_2 \cdot 2H_2O)$$

dickite, nacrite, anauxite, and halloysite. Kaolin clays are usually found to contain between about 30% to 40% $Al_2O_3$, while bentonite clays usually contain less than 20% thereof. Another important characteristic of bentonite clays is their high cationic base-exchange capacity, commonly running between 80 and 100 milliequivalents per 100 grams of air-dried clay. Kaolin clays on the other hand show a low cationic base-exchange capacity, in the order of 2–10 me. per 100 grams of dry clay. X-ray crystallography shows the montmorillonite minerals to have three-layer lattices while kaolin minerals have a two-layer crystal lattice. Differential thermal analysis curves for montmorillonite shows three endothermic peaks at 150–320°, 695–730° and 870–920° C., and one exothermic peak at 925–1050° C. Similar curves for kaolinite show a strong endothermic peak at 620° C. and a strong exothermic peak at 980° C. which sharply differentiate it from other clay mineral groups.

The bentonite clays may be divided into two general categories, the swelling type and the nonswelling type. The latter occurs in many widely separated areas including Arizona, California, Texas, Arkansas, Mississippi, Kentucky, Tennessee and many foreign countries. Swelling type bentonites are found in Wyoming, South Dakota, Montana, Utah, Nevada and California. It is preferred to employ herein the type of swelling bentonite such as is found in Wyoming. This Wyoming clay is found in a relatively high degree of purity. The montmorillonite and kaolinite type clays are in general preferred herein. Clays other than bentonites and kaolins may also be employed provided they have sufficient base-exchange capacity, i.e., at least in the order of about 1 me. per 100 grams.

The organic base component of the organoclay adduct may comprise in general any sufficiently basic monomeric or polymeric amine or ammonium compound containing one or more methylene linkages, and which, preferably, is predominantly composed of hydrocarbon radicals such as aliphatic hydrocarbon radicals. A substantial hydrocarbon moiety is preferred for compatibility with the polyolefin. It is also preferred to employ primary amines (or primary ammonium compounds) since they appear to form strong chemical bonds with the clay matrix. The molecular weight should fall within the range of about 50 and 3000, and preferably about 75 to 1500. If the molecular weight is too low, there will be an insufficient number of methylene linkages to give adequate radiation crosslinkage with the polyolefin, even though the base-exchange sites on the clay are completely saturated with the amine. If the molecular weight is too large, it becomes difficult, because of steric effects, to saturate the base-exchange sites, resulting in a weaker over-all organoclay bond, and an unnecessarily high weight-ratio of organic base to clay.

The atomic ratio of basic nitrogen to methylene carbon in the organic base addend may vary between about 1/1 to 1/50, and preferably between about 1/2 and 1/25. This provides an optimum ratio between clay-addend bonds, and crosslinkage bonds between polyolefin and organoclay.

Suitable organic bases include for example the aliphatic monoamines and polyamines, e.g., ethylamine, 1-propylamine, 1-butylamine, 1-hexylamine, 1-dodecylamine, octa-decylamine, ethylene diamine, hexamethylene diamine, diethylamine, triethylamine, di-n-hexyl amine, di-n-dodecylamine, oleylamine, linoleylamine, polyvinyl amines, polyallylamines, polymethallylamines, linoleylamine-vinylamine copolymers, ethylene-vinylamine copolymers, amino-modified organosilanes such as delta-aminobutyl-methyldiethoxysilane, and the like.

Amines comprising cyclic moieties may also be employed, e.g., piperidine, pyrrolidine, piperazine, β-phenyl-ethylamine, phenyldodecylamine, poly(4-vinylpyridine), polyvinyl piperidines, vinylamine-4-vinyl-pyridine copolymers, 4-vinyl pyridine-ethylene copolymers, 4-vinyl pyridine-methyl methacrylate copolymers, styrene-vinylamine copolymers, styrene-linoleylamine copolymers, etc.

Aliphatic amines comprising hydrophyllic functional groups are also contemplated, so long as the predominant part thereof is hydrocarbon. Suitable examples include the alkanol amines, e.g., ethanol amine, butanol amine, triethanol amine, etc., as well as aminoalkyl acrylates and methacrylates, e.g., β-aminoethyl methacrylate, amino dodecyl acrylate, and polymers thereof; vinyl alcohol-methylallyl amine copolymers, vinyl alcohol-linoleyl-amine copolymers, linoleylamine-methyl methacrylate copolymers, vinyl chloride-linoleylamine copolymers, and the like.

The foregoing organic bases may be added to the clay by either of two general methods. According to the first method, the clay, which usually is found in a form wherein the base-exchange sites are occupied mainly by alkali metal or alkaline earth metal, is first converted to the acid form by replacing the alkali metal or alkaline earth metal with hydrogen ions. This may be accomplished either by leaching the clay with mineral acids or contacting it in aqueous suspensions with a cation exchange resin, such as Amberlite IR–120. The resulting acid clay, e.g. hydrogen montmorillonite, may then be contacted directly with a stoichiometric amount of organic base. These two reactions are illustrated generally by the following equations wherein M designates a montmorillonite platelet and B designates a norganic monoamine such as oleylamine:

$$M(Na)_x + xH^+ \rightarrow M(H^+)_x + xNa^+$$
$$M(H^+)_x + xB \rightarrow M(BH)_x$$

According to the second general method for preparing the organoclay adduct, the organic base is first quaternized by treatment with an acid such as hydrochloric, sulfuric, acetic, phosphoric, etc., or with an organic halide such as methyl chloride, ethyl bromide, or the like. Other quaternizing agents include esters such as methyl sulfate, triethylphosphate, ethyl nitrate and the like. By any of these methods, the organic base is converted to a cation and upon dissolving in water, gives rise by electrolytic dissociation to positively charged ions. These quaternized bases are hence dissolved in water and the clay in its natural form may then be stirred into the solution, whereupon the organoclay is formed metathesis as illustrated by the equation:

$$xB(H^+Cl^-) + M(Na^+)_x \rightarrow M(BH)_x + xNa^+Cl^-$$

By either of the foregoing methods, the organoclay is usually formed in aqueous suspension, and is filtered off, washed and dried. It is generally preferred to use substantially stoichiometric quantities of organic base and clay. This ratio is determined by the base-exchange capacity of the clay, as will be understood by those skilled in the art. In some instances it may be desirable to use less than the stoichiometric amount of organic base. It is found in general that the stoichiometric equivalent of the aforedescribed organic bases will amount to about 0.1 to 20% by weight of the clay. It is preferred to employ between about 0.5% and 15% by weight of the base; larger quantities are in most instances superfluous and give no added advantage.

In cases where the organic base is a copolymer of an unsaturated amine with another unsaturated compound, it is possible to prepare the organoclay by first combining the unsaturated base monomer with the clay by either of the foregoing methods, and then effecting copolymerization of the unsaturated base-clay adduct with the other desired unsaturated vinyl monomer. For example, unsaturated amines having molecular weights between about 40 and 300 units, such as oleylamine, linoleylamine, vinylamine, vinyl pyridine or the like may first be added to the clay and this unsaturated adduct then polymerized with a vinyl monomer such as styrene, vinyl acetate, vinyl chloride, dodecyl acrylate.

Conventional polymerization conditions such as employed in the various emulsion and solution techniques can be used to cause polymerization of the vinyl monomer and bonding to the clay through the reactive olefinic carbons of the unsaturated amine. The base exchanged clay is prepared as an aqueous suspension which can be added directly to the emulsion polymerization zone with the vinyl monomer such as styrene, vinyl chloride and ethylene. To emulsify the vinyl monomer in the aqueous medium about 1 to 5 parts of an emulsifying agent is added per 100 parts of vinyl monomer. Fatty acid and cationic soaps such as sodium lauryl sulfate, dodecylamine hydrochloride, etc. are commonly employed emulsifiers. Initiators are employed to start the polymerization such as potassium persulfate, hydrogen peroxide and ferrous ion, lauroyl peroxide, etc. The polyolefin-organoclay adduct is readily recovered from the aqueous reaction medium by settling, filtration, etc.

In solution polymerization, the vinyl monomer is added to an inert solvent such as benzene, toluene, etc., with a soluble organic peroxide catalyst such as benzoyl peroxide, acetyl peroxide, lauroyl peroxide, etc. and the filtered and dried organoclay solid is added to the system. As in emulsion polymerization, slightly elevated temperature, 30″ to 120° C., are employed and the reactants are agitated. The resultant polyolefin-organoclay adduct can be recovered by evaporating the reaction medium or by precipitating the adduct by the addition of a large excess of methanol.

The polyolefin-organoclay adduct so prepared is thereafter dried, powdered and added to the polyolefin prior to irradiation in the manner hereinafter described.

In still another modification, the unsaturated base monomer may be added to the clay, and the resulting unsaturated base-clay adduct can be copolymerized directly with ethylene, styrene, vinyl chloride or a prepolymer thereof, to form the final clay-polyolefin composition which is then subjected directly to irradiation as hereinafter described.

Ordinarily it is preferred to incorporate the organoclay adduct into the polyolefin by mechanical means such as grinding, fusing, or with the aid of a solvent or dispersing agent. The solid polyolefin and the organoclay may, for example, be thoroughly ground together in a Banbury mixer or ball mill. Alternatively, the polyolefin may be melted and the organoclay adduct stirred into the molten mass, which is then allowed to cool and harden. If a solvent is employed, the polyolefin may be dissolved in for example hexane, petroleum ether, kerosene or the like, and the finely divided organoclay adduct then stirred into the mixture, which is then cooled and/or evaporated to effect coprecipitation of the polyolefin with the clay adduct. Excess solvent is removed by evaporation. Alternatively, an emulsifiable polyolefin may be dispersed in water and co-flocculated with the organoclay. The latter technique is well suited for incorporation of organoclays into polystyrene, polyvinyl chloride, and copolymers thereof in which the polymer is formed as a latex, i.e., dispersed in water and the aqueous suspension of organoclay or the dry powdered organoclay is added to the latex together with a sufficient amount of water (when necessary) to maintain a smooth creamy liquid. This liquid is then dried and powdered to the desired fineness.

The mixture of polyolefin and adduct prepared by any of the above methods may then if desired be fabricated into the final article desired, as for example by extrusion, molding, or other techniques commonly used in the art. Where the subsequent irradiation is to be carried out at high dosage levels to produce a high-melting product, it is ordinarily preferred to fabricate the final article at this point. However, where mild irradiation is to be used, the irradiated product may still remain sufficiently thermoplastic, and hence may be subjected to conventional molding or extrusion following the irradiation.

The proportion of adduct to be added to the polyolefin may vary over a wide range, and the proportion to be used depends upon the ultimate use to which the product is to be put. For uses requiring little flexibility, large proportions of adduct may be used, ranging up to about 80% by weight. Compositions containing for example from about 50–80% by weight of clay adduct may be employed for fabricating rigid articles of construction as for example doors, floor tile, wall boards, building blocks and the like. Where it is desired to retain a considerable amount of flexibility in the finished article, lower proportions of clay adduct should be employed, e.g. between about 5% and 50% by weight.

The mixture of adduct and polyolefin may be subjected to radiation using techniques now commonly employed in the art, all of which involve essentially placing the article in a field of high energy radiations. The radiations may comprise gamma rays, beta rays, alpha rays, and combinations thereof. Ordinarily it is preferred to employ gamma radiations and/or beta radiations because of their greater penetrating power and ready availability from present day nuclear sources. Suitable sources of radiation include for example radioactive isotopes produced by neutronic bombardment in a nuclear pile, fissionable products from nuclear piles, spent fuel elements from nuclear reactors, radioactive isotopes produced by bombardment in particle accelerators, and the emanations themselves from particle accelerators, electron generators and the like. Any effective ionizing radiation, however produced, may be employed. Suitable sources of radiation include for example metallic concentrates of one or more the following isotopes: $Ca^{45}$, $Ce^{144}$, $Ca^{137}$, $Sr^{89}$, $Co^{60}$, $Sc^{46}$, $Y^{90}$. An electron generator well suited for use in irradiation of the organoclay-polymer composition of our invention is an electron beam generator, commercially available from the The General Electric Company in 1, 2 and 3.5 million volt sizes having beam out currents of 6 to 8 milliamperes. These devices emit a beam of electrons which is focused on the article to be irradiated. Conveniently the article can be moved through the electron beam at the desired speed to achieve the necessary irradiation dosage. These electron generators are described in United States Patent 2,144,518 to Westendorp and in "Electronics," vol. 16, pages 128–133 (1944).

Where the mass of polyolefin-adduct mixture is large and concentrated, it is preferred to employ gamma radiations because of their greater powers of penetration. Beta rays and alpha rays have relatively shorter ranges in solid materials, and are hence usable herein only where the polyolefin-adduct mixture is treated in attenuated form, as for example filaments or thin sheets. If beta radiations are employed it is preferred to use high energy radiations in the range of about 0.5 to 4.0 mev.

It is conventional in radiation technology to define operative radiation dosages in terms of the amount of energy absorbed per gram by the material being irradiated. A conventional measure of such energy absorption is the megarad (1,000,000 rads, 1 rad being equivalent to 100 ergs per gram of material irradiated). For purposes of the present invention, dosages ranging between about 1 and 1000 megarads may be employed and preferably between about 5 and 200. The optimum dosage depends upon the identity of the polyolefin, the initial molecular weight of the polyolefin, and the degree of crosslinking desired in the final product. Dosages in the high ranges are preferred for polyolefins such as polyethylene and polystyrene and where highly rigid, highly crosslinked structures are desired, and/or where the original polyolefin was of low molecular weight, e.g. below about 20,000. Conversely, where a more flexible product is desired and/or where high molecular weight polyolefins are used, dosages in the lower ranges specified will usually be employed. The precise dosage to be used hence will depend on the desired product specifications and raw materials, and can readily be determined experimentally.

Ordinarily the radiation is carried out at normal room temperatures, but other operative temperatures may be employed, and specifically temperatures ranging between about −50° and 200° C. Those skilled in the art will understand that any treating unit containing a source of radiation must be handled with due care, and adequate shielding of lead or concrete provided in order to protect the operator.

The following examples are cited to illustrate certain applications of the invention, but are not intended to be limiting in scope.

EXAMPLE I

A commercial, high-pressure type polyethylene of average molecular weight 24,000 (Bakelite DYNK) was milled together with 50% by weight of a Wyoming bentonite having a particle size range of about 0.05 to 2 microns and base-exchange capacity of 100 me. per 100 grams. The powdered mixture was then molded by heat and pressure into a sheet of thickness about 0.042 inch. The sheet was then cut into strips 0.110 inch in width. One portion of the strips was irradiated at about 27.7 megarads, and another portion at 146.4 megarads (by exposure to radiation from spent atomic reactor fuel elements—predominantly gamma rays). Samples of the irradiated strips were then compared with the unirradiated strips, and with strips of the original polyethylene (milled), for tensile strength, using an Instron tensile testing machine. The results were as follows:

Table 1

| Sample No. | Composition, Wt. Percent | | Irradiation Dosage, Megarads | Tensile Strength, lbs./sq. in.[1] |
|---|---|---|---|---|
| | Clay | Polyethylene | | |
| 1 | 0 | 100 | 0 | 2,923 |
| 2 | 50 | 50 | 0 | 1,800 |
| 3 | 50 | 50 | 27.7 | 1,983 |
| 4 | 50 | 50 | 146.4 | 2,023 |

[1] Average values of 2 or more tests.

It will thus be apparent that but little improvement in tensile strength is obtainable by irradiating simple clay-polyethylene mixtures and in no instance does the clay filled polymer have a tensile strength comparable to the unfilled polymer.

EXAMPLE II

A sample of pure hydrogen montmorillonite was prepared as follows: A 2% aqueous suspension in distilled water of the Wyoming bentonite of Example I was prepared, and percolated first through a bed of ammonium-charged cation exchange resin (Amberlite IR-120) to exchange ammonium ions for the lattice exchange cations of the clay. Naturally present adsorbed salts on the clay are also leached out and removed as dissolved ammonium salts. The resulting ammonium montmorillonite suspension was then percolated through a bed of anion exchange resin (Amberlite IRA-400) to convert dissolved ammonium salts to ammonium hydroxide. The effluent from this treatment was finally percolated through a bed of hydrogen exchange resin (IR-120) to convert the ammonium montmorillonite to hydrogen montmorillonite, and to neutralize the ammonium hydroxide in solution. This suspension was used in Example III to prepare various organoclay adducts. A portion of the suspension however was dried and compounded with polyethylene (50/50 ratio) as described in Example I. The resulting acid clay-filled polyethylene was found to have a tensile strength of 1904 p.s.i., which is not substantially higher than that of the sodium clay-filled polyethylene.

EXAMPLE III

Portions of the hydrogen-montmorillonite suspension of Example II were reacted with various organic bases to prepare organoclay adducts (samples 5–10, Table 2). The technique consisted merely in adding a dilute solution, or suspension, in water of the desired base gradually with stirring to the acid clay suspension until the pH reached 7.0. This required the addition of from about 1% to 15% by weight of the organic base, based on clay. The resulting flocculated solid adducts were recovered by filtration, and air dried.

The air-dried organoclays were then milled with an equal weight of polyethylene as described in Example I, and the homogeneous powder then heat-pressed into sheets 0.110 inch in thickness. Certain other commercially available organoclays (samples 11–16) were similarly compounded with the polyethylene and pressed into sheets. All the sheets were then cut into strips, and portions of each sample irradiated at 27.7 megarads and 146.4 megarads as described in Example I. Tensile strengths of the resulting products were as follows:

Table 2

| Sample No. | Organic Base | Composition, Wt. percent | | | Irradiation Dosage, Megarads | Tensile Strength, lbs./sq.in. |
|---|---|---|---|---|---|---|
| | | Organic Base | Clay | Polyethylene | | |
| 1 | None | 0 | 0 | 100 | 0 | 2,923 |
| 2 | ___do___ | 0 | 50 | 50 | 0 | 1,800 |
| 5 | Hexamethylene diamine | 2 | 48 | 50 | 0 | 2,228 |
| 6 | ___do___ | 2 | 48 | 50 | 27.7 | 2,450 |
| 7 | ___do___ | 2 | 48 | 50 | 146.4 | 2,640 |
| 8 | Oleylamine | 8 | 42 | 50 | 0 | 2,058 |
| 9 | ___do___ | 8 | 42 | 50 | 27.7 | 2,340 |
| 10 | ___do___ | 8 | 42 | 50 | 146.4 | 2,705 |
| 11 | Bentone-18 [1] | 7 | 43 | 50 | 0 | 1,800 |
| 12 | ___do [1]___ | 7 | 43 | 50 | 27.7 | 2,050 |
| 13 | ___do [1]___ | 7 | 43 | 50 | 146.4 | 2,532 |
| 14 | Bentone-34 [2] | 8 | 42 | 50 | 0 | 941 |
| 15 | ___do [2]___ | 8 | 42 | 50 | 27.7 | 1,199 |
| 16 | ___do [2]___ | 8 | 42 | 50 | 146.4 | 1,070 |

[1] Essentially octadecylamine bentonite.
[2] Essentially octadecyl-hexadecylamine bentonite.

It will thus be apparent that irradiation especially at 146.4 megarads, effects a marked improvement in tensile strength of polyethylene-organoclay adduct mixtures, where only slight improvement is obtained by irradiating simple clay-polyethylene mixtures. Samples 7 and 10 show tensile strengths which are substantially that of the unfilled polyethylene.

EXAMPLE IV

A sample of pure hydrogen kaolinite was prepared as follows: A 2% aqueous suspension of Georgia kaolinite in distilled water was prepared. The kaolinite had an average particle size of about 0.5 micron. The clay powder was dispersed by use of one gram of sodium hexametaphosphate per 500 grams of clay. The resultant suspension was then percolated through ion exchange columns in the manner described in Example II. The effluent from the hydrogen exchange resin had a pH of 3.75 and a base exchange capacity of about 1.8 me. per 100 grams.

A sample of the hydrogen clay effluent was then neutralized to a pH of 7.0 by the addition of 4-vinyl pyridine as an alcoholic solution. The neutralized product was filtered, the filtrate dried and found to have a 4-vinyl pyridine content of 0.375 weight percent (based on a Kjeldahl nitrogen analysis).

A second sample of the hydrogen kaolinite suspension was neutralized to a pH of 7.0 by the addition of an aqueous solution of hexamethylene diamine. The neutralized liquid was filtered and the filtrate dried and powdered. The powder had a hexamethylene content (based on a Kjeldahl nitrogen analysis) of 0.10 weight percent.

A calcium kaolinite was prepared by passing a 2 weight percent aqueous solution of kaolinite through columns having an ammonium charged, then a hydroxyl charged and finally a calcium charged bed of ion-exchange resin in the manner previously described. The effluent was filtered and the filtrate dried and powdered.

EXAMPLE V

The dried kaolinite clays with the 4-vinyl pyridine, the hexamethylene and the calcium additives were then blended into equal weights of polyethylene (Bakelite DYNK) on a steam heated mill. The sheet from the mill was molded between standard ferroplates treated with a silicone release agent in a hydraulic press at about 1340 p.s.i.g. for about 15 minutes.

Samples of the molded sheets were then irradiated in a 2 million electron volt electron beam generator as previously described. Samples of each clay-polymer composition were placed in an envelope of 5 mil polyethylene, the envelope filled with nitrogen, sealed and thereafter irradiated at 10, 55 and 100 megarad levels.

The irradiated samples and one unirradiated sample of the clay-polymer compositions were then tested for tensile strength using an Instron tensile testing machine. Samples of the compositions were also immersed in boiling toluene for 24 hours and the weight loss of the composition determined. Within the 24-hour period all the unirradiated samples completely disintegrated in toluene.

The results are summarized as follows:

Table 3

| Sample No. | Clay | Irradiation Dosage (Megarads) | Tensile Strength, lbs./sq. in. | Weight percent loss in toluene in 24 hours |
|---|---|---|---|---|
| 17 | calcium kaolinite | 0 | 2,341 | 100 |
|  |  | 10 | 2,505 | 17.2 |
|  |  | 55 | 2,495 | 4.5 |
|  |  | 100 | 2,201 | 3.2 |
| 18 | hexamethylene diamine kaolinite. | 0 | 2,363 | 100 |
|  |  | 10 | 2,444 | 15 |
|  |  | 55 | 2,719 | 4.2 |
|  |  | 100 | 2,140 | 2.5 |
| 19 | 4-vinyl pyridine kaolinite. | 0 | 3,043 | 100 |
|  |  | 10 | 2,578 | 18.3 |
|  |  | 55 | 2,881 | 3.6 |
|  |  | 100 | 2,695 | 2.8 |
| 20 | None, 100% polyethylene. | 0 | 1,649 | 100 |
|  |  | 10 | 1,465 | 43.5 |
|  |  | 55 | 1,534 | 12.1 |
|  |  | 100 | 1,662 | 7.8 |

The preceding table shows that the organoclays, i.e., the kaolinite having an organic addend gave superior tensile strengths and a greater solvent resistance to polyethylene than obtainable with an inorganic addent, calcium. This superiority in results was observed despite the slight amounts of organic material on the clay surface; 0.375 weight percent of 4-vinyl pyridine and 0.10 weight percent of hexamethylene diamine.

EXAMPLE VI

Samples of the dried and powdered 4-vinyl pyridine and hexamethylene kaolinites are blended into a polystyrene latex at about a 1:1 ratio of organoclay to polystyrene. The polystyrene content of the latex is about 50 weight percent. The latex is stirred rapidly during addition of the organoclay and sufficient water is added to maintain a smooth creamy liquid. The blends are stirred rapidly for 15 minutes at room temperature and then poured into pans and placed in an oven at 80° centigrade and 25 inches of water absolute pressure to evaporate to dryness. To preclude oxidation the oven is swept with nitrogen prior to use. The dried product is a porous gray solid which is powdered and molded into flat plates. These plates are then irradiated with an electron beam at about 100 megarads. When tested for tensile and solvent resistance to boiling toluene an organoclay filled and irradiated polystyrene exhibits similar results as polyethylene in that the organoclay filled and irradiated samples have substantially greater solvent resistance than unfilled and irradiated polystyrene. This solvent resistance is achieved with no substantial lessening of the polymers tensile strength.

EXAMPLE VII

An oleyl amine montmorillonite organoclay was prepared in the manner described in Example III. One hundred grams of the dried and powdered oleyl amine-montmorillonite organoclay were then slowly added to 147.3 milliliters of a polyvinyl chloride latex having 100 grams of polyvinyl chloride. The latex was stirred rapidly in a Waring Blendor during the addition of the organoclay and 725 milliliters of water were added to obtain a smooth creamy liquid having a yellow cream color. The liquid was evaporated to dryness in an oven at 90° C. and 25 inches of water absolute pressure. To prevent oxidation, the oven was swept with nitrogen.

The dried organoclay filled polyvinyl chloride resin was then pulverized and the powder molded into thin sheets 0.10 inch in thickness. Samples of the molded sheet were placed into an envelope formed of 4 mil polyethylene film; air in the envelope was displaced with nitrogen and the envelope sealed. The samples of the filled and unfilled polyvinyl chloride sheet were then irradiated by passing the envelopes through an electron beam of the aforedescribed electron beam generator at a dosage of 4 megarads per pass. Twenty passes were made with a 10-15 minute cooling period between passes to obtain a total irradiation of 100 megarads.

To determine their solvent resistance, the irradiated filled and unfilled polyvinyl chloride sheets were immersed in boiling chlorobenzene for 48 hours and their weight loss during the extraction measured. For comparison, unirradiated samples of the filled and unfilled polyvinyl chloride were also extracted. The results are summarized in Table 4. From this data, it is apparent that the organoclay filled polyvinyl chloride had the greatest solvent resistance, indicating that the polyvinyl chloride was bonded to the oleyl amine which in turn was bonded by base exchange to the clay surface.

Table 4

| Sample No. | Organic Base | Composition, Wt. Percent | | | Irradiation Dosage, Megarads | Solvent Resistance, Wt. Percent Loss |
|---|---|---|---|---|---|---|
| | | Organic Base | Clay | Polyvinyl Chloride | | |
| 21 | Oleylamine | 8 | 42 | 50 | 0 | 60.5 |
| 22 | Do | 8 | 42 | 50 | 100 | 10.9 |
| 23 | None | 0 | 0 | 100 | 0 | 100 |
| 24 | Do | 0 | 0 | 100 | 100 | 13 |

EXAMPLE VIII

A 4-vinyl pyridine-kaolinite clay was prepared as described in Example IV. Five grams of this organoclay were added to a flask with 10 milliliters of benzene and 10 milliliters of styrene. Fifty milligrams of benzoyl peroxide were added and the contents of the flask stirred for 18 hours at 70°–75° centigrade. Thereafter the contents of the flask were cooled and poured into methanol. The resultant precipitate in methanol was filtered, dried and weighed. The total weight of the reaction product was 9.29 grams.

The precipitate readily dispersed in chloroform to give a stable milky suspension which could not be filtered. When a physical mixture of equal amounts of 4-vinyl pyridine kaolinite clay and polystyrene are added to chloroform, the polystyrene rapidly dissolves and the 4-vinyl pyridine kaolinite settles out. In contrast, the aforedescribed reaction product of styrene polymerized in the presence of 4-vinyl pyridine clay can be separated from the chloroform only by severe centrifugation. Repeated extractions with chloroform fail to destroy this dispersibility of the reaction product in chloroform, indicating that some of the polystyrene is bonded to the 4-vinyl pyridine kaolinite.

The aforedescribed polystyrene-4-vinyl pyridine kaolinite reaction product can be milled into polyolefin compositions such as polyethylene, polystyrene, polyvinyl chloride in the manner prescribed for the previously described organoclays. If desired the product can be incorporated into the polyolefin in any desired amount by adding it to a latex of the polyolefin. When incorporated into the polyolefin and irradiated, the polystyrene-4-vinyl pyridine kaolinite reaction product enhances the tensile strength and solvent resistance of the polyolefin.

EXAMPLE IX

One liter of the hydrogen montmorillonite suspension prepared as in Example II was placed in a flask and heated to about 80° C. One hundred eighty milliliters of a one percent alcoholic solution of diallyl amine was added to the clay suspension and stirred for 15 to 30 minutes. One hundred seventy nine milliliters of a 10% vinyl toluene alcoholic solution was then added to the contents of the flask and one gram of azo-bis-isobutyro nitrile was also added to initiate polymerization. The contents of the flask were held at 80° C. for about 4 hours and thereafter the reaction mixture was filtered and the filtrate washed and dried. The yield of dried filter cake was 45 grams having an ash analysis of 30 percent. The powdered solid molded into a translucent sheet. Forty-three percent of the molded sheet were insoluble in boiling toluene, indicating that 13 percent of the organic polymer was bonded to the clay.

As described, the molded sheet can be irradiated to further enhance its solvent resistance or the powdered filter cake (itself an organoclay adduct) can be admixed with another polyolefin such as polystyrene, polyethylene, polyvinyl chloride. The mixture is thereafter molded and irradiated to produce organoclay-polyolefins of enhanced solvent resistance and tensile strengths in accordance with our invention.

Other organoclay-polyolefin mixtures which are similarly improved by irradiation at 50–200 megarads include the following:

As will be apparent to those skilled in the art, many other analogous compositions may be prepared by the methods herein disclosed. The foregoing description is not intended to be limiting in scope except where stated; modifications obviously to those skilled in the art are intended to be included. The true scope of the invention is intended to be defined by the following claims:

This application is a continuation-in-part of U.S. Serial No. 712,618, now abandoned.

We claim:

1. A method for incorporating clay into a thermoplastic polyolefin, which comprises base-exchanging said clay with an organic nitrogen base containing at least one active methylene linkage, thereby forming an organoclay adduct, incorporating said adduct intimately into said polyolefin in ratios between about 5/95 and 80/20 of adduct/polyolefin and heat-fusing the mixture, then subjecting said heat-fused mixture to high energy, ionizing radiation at a dosage level between about 1 and 1,000 megarads to induce crosslinkage between methylene groups.

2. A process as defined in claim 1 wherein said organic base has a molecular weight between about 75 and 1500, and wherein the atomic ratio of basic nitrogen to methylene carbon is between about 1/1 and 1/50.

3. A process as defined in claim 1 wherein said ionizing radiation consists predominantly of gamma rays.

4. A process as defined in claim 1 wherein said polyolefin is polyethylene of molecular weight between about 10,000 and 40,000.

5. A method for stiffening thermoplastic polyolefins while maintaining a desired tensile strength thereof, which comprises base-exchanging a natural clay with approximately a stoichiometric ratio of an organic nitrogen base, said nitrogen base having a molecular weight between about 50 and 3,000 and wherein the atomic ratio of basic nitrogen to methylene carbon is between about 1/1 and 1/50, thereby forming an organoclay adduct, intimately incorporating said organoclay adduct into said polyolefin in ratios between about 5/95 and 80/20 of adduct/polyolefin and heat-fusing the mixture, and thereafter subjecting said heat-fused mixture to high energy, ionizing radiation at a dosage between about 5 to 200 megarads.

6. A process as defined in claim 4 wherein said clay is essentially bentonite.

7. A process as defined in claim 4 wherein said clay is essentially kaolin.

8. A process as defined in claim 4 wherein said organic base is an alkylene diamine.

9. A process as defined in claim 4 wherein said organic base is oleylamine.

10. A synthetic plastic composition comprising a polyolefin, and intimately incorporated therein an adduct of a clay with an organic nitrogen base in ratios between

*Table 5*

| | Organoclay | | Polyolefin, wt. percent |
|---|---|---|---|
| | Clay, Wt. Percent | Organic Base, Wt. Percent | |
| 1 | Bentonite, 40% | Copolymer: ethylene, 90%, vinylamine, 10%, 1,000 M.W., 4% | Polyethylene, 56% (D-130, M.W. 28-30,000). |
| 2 | Bentonite, 60% | Copolymer: ethylene, 80%, 4-vinylpyridine, 20%, M.W. 800-1,000, 3% | Polyethylene, 37% (D-85, M.W. 24-2,600). |
| 3 | Kaolin, 30% | piperazine, 1% | Polyethylene, 69% (D-100, M.W. 26-2,800). |
| 4 | Kaolin, 20%; Bentonite, 20% | polyvinylpiperidine (1,500 M.W.), 2% | Polypropylene, 58%. |
| 5 | Bentonite, 25% | polymethallylamine (800 M.W.), 1% | Polyisobutylene, 74% (M.W. 40-50,000). |
| 6 | Bentonite, 65% | polyallylamine (1,200 M.W.), 3% | Copolymer: ethylene, 75%, isobutylene, 25%, M.W. 30-40,000, 32% |
| 7 | Kaolin 48% | hexamethylene diamine, 2% | Polyethylene, 50% (Low pressure, linear). | about 5/95 and 80/20 of adduct/polyolefin, said organic base being composed predominantly of hydrocarbon moieties and having a molecular weight between about 50 and 3000 and an atomic ratio of basic nitrogen to methylene carbon of between about 1/1 and 1/50, said adduct being crosslinked through its methylene linkages to said polyolefin, and being characterized by an improved tensile strength as a result of said crosslinking.

11. A composition as defined in claim 10 wherein said polyolefin is polyethylene.

12. A composition as defined in claim 10 wherein said clay is essentially bentonite.

13. A composition as defined in claim 10 wherein said clay is essentially kaolin.

14. A composition as defined in claim 10 wherein said organic base is hexamethylene diamine.

15. A composition as defined in claim 10 wherein said organic base is oleylamine.

16. A composition as defined in claim 10 wherein said organic base is polyallylamine.

17. A composition as defined in claim 10 wherein said organic base is polymethallylamine.

18. A composition as defined in claim 10 wherein said organic base is a copolymer of ethylene and 4-vinylpyridine.

19. A process as defined in claim 1 wherein said polyolefin is polystyrene.

20. A process as defined in claim 1 wherein said polyolefin is polyvinyl chloride.

21. A composition as defined in claim 10 wherein said polyolefin is polystyrene.

22. A composition as defined in claim 10 wherein said polyolefin is polyvinyl chloride.

23. The method of claim 5 wherein said organoclay adduct comprises a polyolefin attached to said clay with a terminal nitrogen base, said adduct having been prepared by base exchanging said clay with an unsaturated amine having a molecular weight between about 40 and about 300 units and thereafter subjecting said base exchanged clay to polymerizing conditions in the presence of an olefin selected from the group consisting of ethylene, styrene and vinyl chloride.

24. The method of claim 23 wherein said unsaturated amine is vinyl pyridine and said olefin is styrene.

References Cited in the file of this patent

UNITED STATES PATENTS

| | | |
|---|---|---|
| 2,622,987 | Ratcliffe | Dec. 23, 1952 |
| 2,768,992 | Zukas | Oct. 30, 1956 |
| 2,773,043 | Zukas | Dec. 4, 1956 |

FOREIGN PATENTS

| | | |
|---|---|---|
| 742,933 | Great Britain | Jan. 4, 1956 |
| 773,529 | Great Britain | Apr. 24, 1957 |

OTHER REFERENCES

Chem. and Eng. News, vol. 33, Nov. 21, 1955, pages 5091–92.